United States Patent
Xu et al.

(10) Patent No.: US 10,472,084 B2
(45) Date of Patent: Nov. 12, 2019

(54) MOTOR-GENERATOR FOR HIGH EFFICIENCY AUXILIARY POWER SYSTEM

(71) Applicant: HONEYWELL INTERNATIONAL INC., Morris Plains, NJ (US)

(72) Inventors: Ming Xu, Oro Valley, AZ (US); Cristian Anghel, Oro Valley, AZ (US); Eric Blumer, Scottsdale, AZ (US); Wayne Pearson, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 580 days.

(21) Appl. No.: 15/076,274

(22) Filed: Mar. 21, 2016

(65) Prior Publication Data

US 2017/0267369 A1 Sep. 21, 2017

(51) Int. Cl.
*B64D 41/00* (2006.01)
*B64D 13/06* (2006.01)

(52) U.S. Cl.
CPC ............ *B64D 41/00* (2013.01); *B64D 13/06* (2013.01); *B64D 2013/0611* (2013.01); *B64D 2013/0644* (2013.01); *B64D 2041/002* (2013.01); *Y02T 50/56* (2013.01)

(58) Field of Classification Search
CPC .... B64D 41/00; B64D 13/06; B64D 13/2013; B64D 13/0644; B64D 13/0611; B64D 2041/002; B64D 2041/0648; B64D 2013/0611; Y02T 50/56
See application file for complete search history.

(56) References Cited

U.S. PATENT DOCUMENTS

| | | | | |
|---|---|---|---|---|
| 4,494,372 A | * | 1/1985 | Cronin | B64D 13/06 60/785 |
| 4,503,666 A | * | 3/1985 | Christoff | B64D 13/06 60/39.183 |
| 5,281,905 A | | 1/1994 | Dhyanchand et al. | |
| 5,549,524 A | | 8/1996 | Yang | |
| 5,644,200 A | | 7/1997 | Yang | |
| 6,058,715 A | * | 5/2000 | Strang | B64D 13/06 62/172 |
| 6,365,983 B1 | | 4/2002 | Masberg et al. | |
| 6,462,429 B1 | | 10/2002 | Dhyanchand et al. | |
| 7,301,311 B2 | | 11/2007 | Xu et al. | |

(Continued)

OTHER PUBLICATIONS

Amit Kumar Jain et al., Integrated Starter Generator for 42-V Powernet Using Induction Machine and Direct Torque Control Technique, IEEE Transactions on Power Electronics, May 2006, pp. 701-710, vol. 21, No. 3.

(Continued)

*Primary Examiner* — Tien Q Dinh
*Assistant Examiner* — Vicente Rodriguez
(74) *Attorney, Agent, or Firm* — Shimokaji IP

(57) ABSTRACT

A system for driving an environmental control system (ECS) of a vehicle with ground-based electrical power may include a turbine engine on board the vehicle, coupled to the ECS to pneumatically drive the ECS, and an electric machine, on board the aircraft, mechanically coupled to the turbine engine, to drive the turbine engine. A control system such that the electric machine provides motoring assistance to the turbine engine, and that the motoring assistance is limited to match the available current from the ground-based electrical power.

7 Claims, 4 Drawing Sheets

(56) References Cited

U.S. PATENT DOCUMENTS

| | | | |
|---|---|---|---|
| 7,514,806 B2 | 4/2009 | Xu et al. | |
| 7,990,115 B2 | 8/2011 | Anghel et al. | |
| 8,030,788 B2 | 10/2011 | Xu et al. | |
| 8,294,431 B2 | 10/2012 | McLean et al. | |
| 8,378,510 B2 | 2/2013 | Tanaka et al. | |
| 8,666,633 B2 | 3/2014 | Ertz et al. | |
| 2006/0231680 A1* | 10/2006 | Derouineau | B64D 13/02 244/118.5 |
| 2010/0308581 A1* | 12/2010 | Anghel | F02C 7/275 290/31 |
| 2012/0017602 A1* | 1/2012 | Hansen | F01D 19/00 60/778 |
| 2016/0039371 A1* | 2/2016 | Blumer | B60L 11/02 290/31 |

OTHER PUBLICATIONS

Irfan Alan et al., Starter/Generator Employing Resonant-Converter-fed Induction Machine Part I: Analysis, Oct. 2000, pp. 1309-1318, vol. 36, No. 4.

Yoshitaka Kawabata et al., Variable Speed Constant Frequency Stand-alone Power Generator Using Wound-Rotor Induction Machine, Aug. 2004, pp. 1778-1784, vol. 3.

* cited by examiner

MOTOR-GENERATOR FOR HIGH EFFICIENCY AUXILIARY POWER SYSTEM

BACKGROUND OF THE INVENTION

The present invention relates generally to providing power to drive an environmental control system (ECS) on a vehicle. More particularly, the invention relates to providing power to the ECS from a ground-based source.

When a vehicle such as an aircraft is parked at a gate during embarkation and/or disembarkation of passengers, the ECS may operate to maintain a comfortable cabin temperature. During such gate-parking time, the ECS is usually driven by pneumatic power provided by bleed air from a turbine engine such as an auxiliary power unit (APU) of the aircraft.

A typical APU is designed to minimize size and weight since it is carried with the aircraft through its full mission. Additionally it is powered from jet fuel. Consequently running the APU can be relatively expensive.

Many airports have ground-based electrical power sources that can be readily connected to an aircraft parked at a gate. While the ground-based power sources can bring energy into the parked aircraft for AC loads, a typical aircraft is not equipped to utilize this ground-based electrical power to drive the ECS. If an aircraft were so equipped, then fuel savings could result from diminished use of the APU.

As can be seen, there is a need for reducing use of fuel to drive an ECS when a vehicle is parked. More particularly, there is a need for a system to drive the ECS with minimum consumption of fuel in the APU turbine engine. Moreover, there is a need for a system that facilitates use of ground-based electrical power to supply power for the ECS when the vehicle is parked.

SUMMARY OF THE INVENTION

In one aspect of the present invention, a system for driving an environmental control system (ECS) of a vehicle with ground-based electrical power comprises: a turbine engine on board the vehicle and coupled to the ECS to pneumatically drive the ECS; an electric machine on board the vehicle and mechanically coupled to the turbine engine to drive the turbine engine while the turbine engine drives the ECS.

In another aspect of the present invention, apparatus for controlling speed of a turbine engine of a parked vehicle comprises: an electrical power pathway, on board the vehicle, for ground-based electrical power; an electric machine, on board the vehicle, electrically coupled to the electrical pathway and mechanically coupled to the turbine engine to assist rotation of the turbine engine; a turbine-speed controller with a non-volatile memory; a first signal path between the electrical pathway and the turbine-speed controller; and a second signal path for a turbine engine speed signal between an output of the turbine-speed controller and the turbine engine; wherein the non-volatile memory incorporates a relationship between available current from the ground-based power source and an operating speed of the turbine engine sufficient to drive an environmental control system (ECS) of the vehicle when being assisted by the electric machine.

In still another aspect of the present invention, a method for driving an environmental control system (ECS) of a vehicle with ground-based electrical power comprises the steps of: operating a turbine engine of the vehicle with power produced by fuel combustion; driving an electric machine, coupled to the turbine engine, with ground-based electrical power to assist rotation of the turbine engine; and driving the ECS with pneumatic power from the turbine engine.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide a system for driving an environmental control system (ECS) of a vehicle, such as an aircraft, with power from a remote power source. More particularly, the invention may provide for reducing fuel consumption of a turbine engine, such as an auxiliary power unit (APU) of a parked vehicle when the turbine engine drives the ECS, for example at the terminal gate for an aircraft. Still further, the invention may provide a system for utilizing available ground-based electrical power to provide at least some portion of energy needed to drive the ECS of the parked vehicle.

Figure 1:
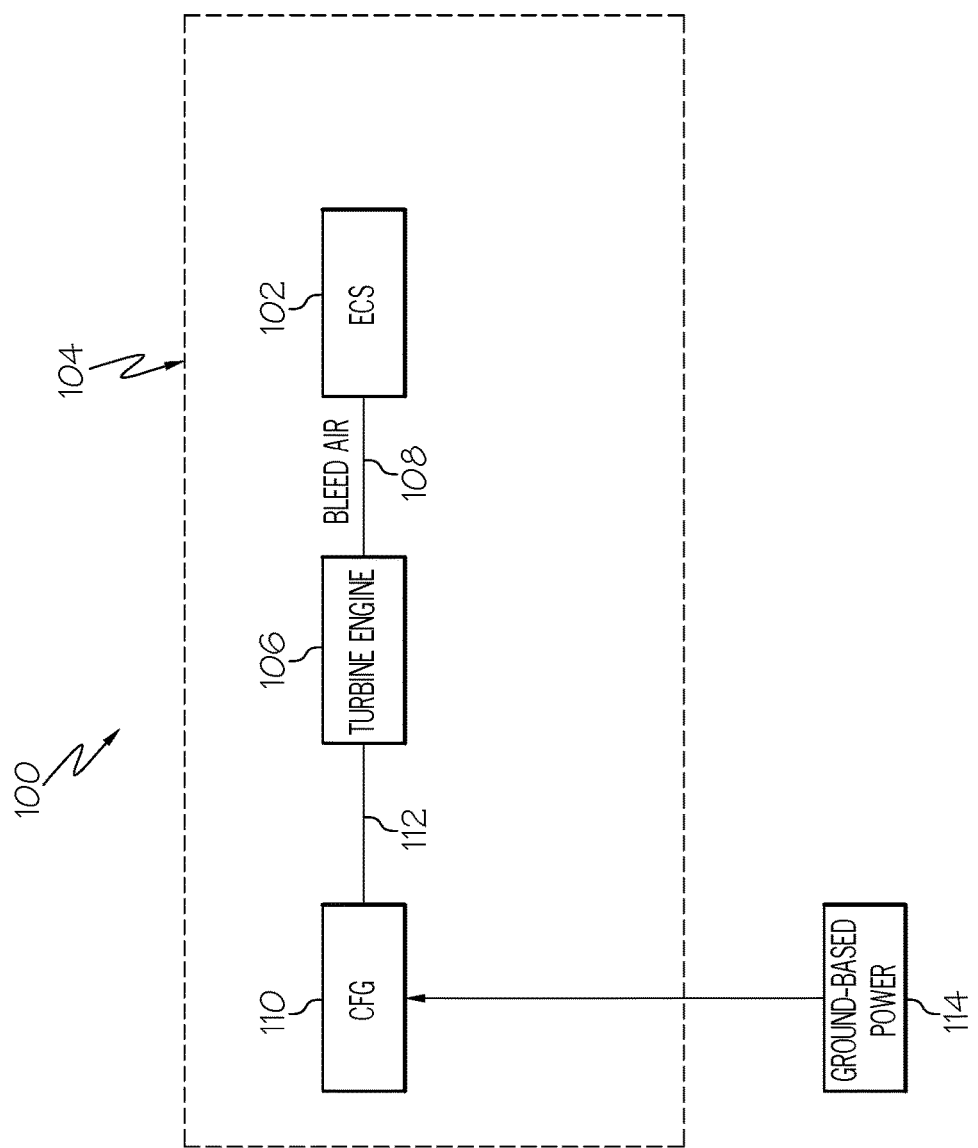
FIG. 1 is a block diagram of a system for driving an environmental control system (ECS) of a vehicle in accordance with an exemplary embodiment of the invention.

Referring now to FIG. 1, a block diagram illustrates an exemplary embodiment of a system 100 for driving an environmental control system (ECS) 102 of a vehicle 104. The vehicle 104 may be, for example, an aircraft or a ground-based vehicle such as a military armored personnel carrier of a tank. The ECS 102 may be coupled to a turbine engine 106 of the vehicle 104 and powered pneumatically by bleed air from the engine 106. In the exemplary embodiment shown in FIG. 1, the engine 106 may be an auxiliary power unit (APU) 106 of an aircraft 104. The APU 106 may be coupled to the ECS 102 with a bleed air duct 108. An electric machine 110 may be mechanically coupled to the APU 106 with a shaft 112.

In the exemplary embodiment of FIG. 1 the electric machine 110 may be a controllable frequency generator (CFG) 110. The CFG 110 may have features such as those disclosed and described in U.S. Pat. No. 7,514,806, M Xu et al., issued Apr. 7, 2009, which patent is incorporated herein in its entirety.

The shaft 112 may function as an output shaft for purposes of transmitting power into the APU 106 when the CFG 110 acts as a starter. The shaft 112 may function as an input shaft for purposes of transmitting power out of the APU 106 and into the CFG 110 when the CFG 110 acts as a generator. The shaft 112 may be hereinafter referred to as a CFG input/output shaft 112.

A ground-based source 114 of electrical power may be coupled to deliver electrical power to the CFG 110 when the aircraft 104 is parked at a terminal gate.

It may be noted that the CFG 110 may produce electrical power at a constant frequency (e.g., 400 Hz) irrespective of the rotational speed of the APU 106. Consequently, speed of the APU 106 may not need to be limited to a single designated frequency-controlling speed. Instead, the APU 106 may be operated at a speed that is just high enough to produce a requisite amount of bleed air to drive the ECS 102 in a manner that meets ambient conditions at a particular terminal gate. For example, the vehicle 104 may be an aircraft and the APU 106 may operate at a first speed when the aircraft is parked at a terminal gate in Phoenix in July where ambient temperature may be as high as 110 degrees F. The APU 106 may operate at a second and lower speed when the aircraft is parked in Atlanta in October where the ambient temperature may be only about 60 degrees F. As hereinafter described, the APU 106, when coupled to CFG 110, may be controlled to operate at speeds that do not result in fuel consumption greater than that needed to drive the ECS 102.

Fuel savings may also be achieved if the APU 106 is provided with motoring assist from the CFG 110. This motoring assist may accomplished by connecting the ground-based power source 114 to the CFG 110. The CFG 110 may provide rotational mechanical force to the APU 106 and the APU 106 may then deliver requisite bleed air to the ECS 102 while consuming less fuel than it would otherwise consume if it were not mechanically assisted by the CFG 110.

Figure 2:
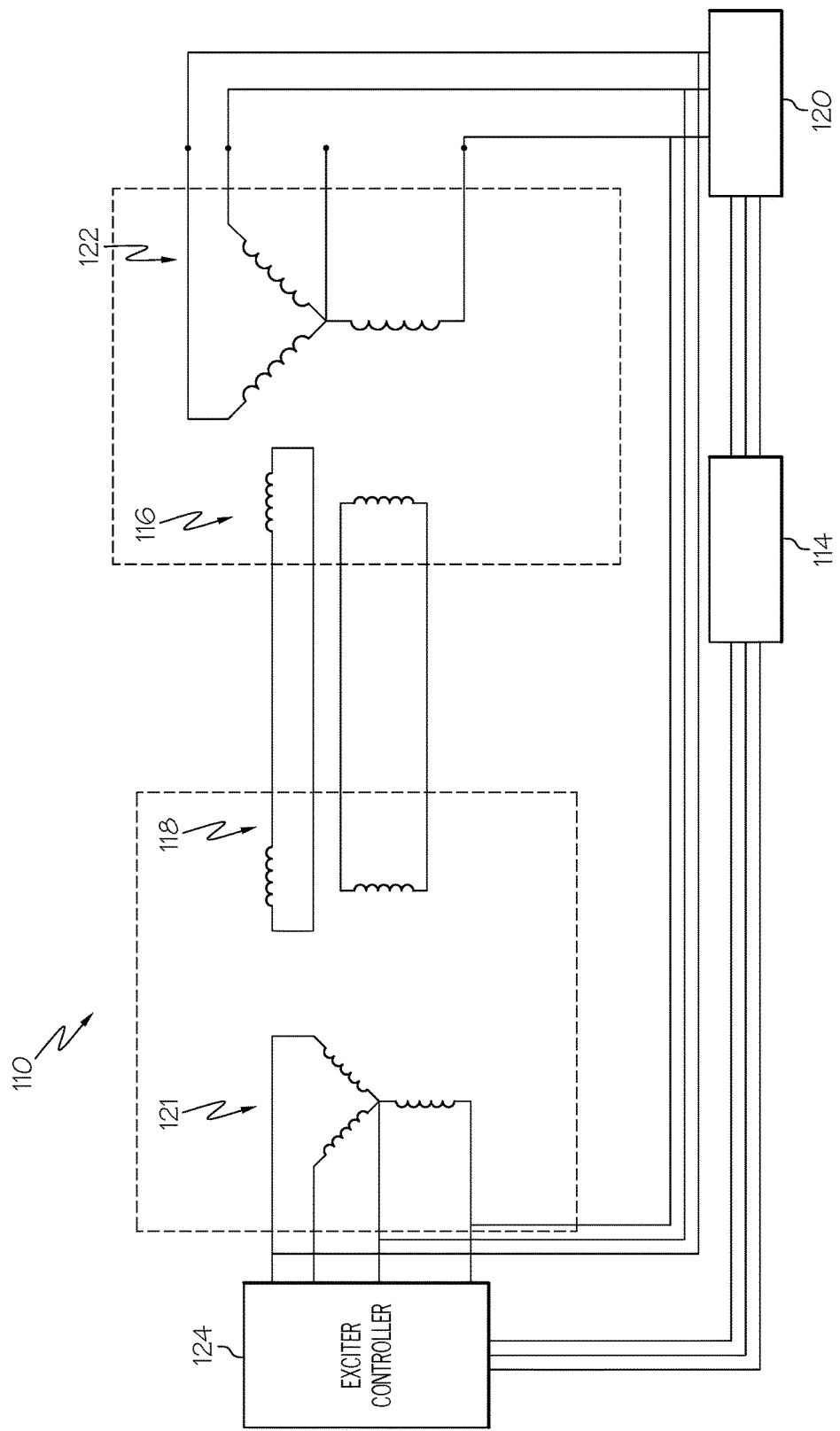
FIG. 2 is schematic diagram of an electric machine employed in the system of FIG. 1 in accordance with an exemplary embodiment of the invention.

Referring now to FIG. 2, it may be noted that the CFG 110 may be constructed so that a main rotor winding 116 is connected directly to an exciter rotor winding 118. Consequently, the CFG 110 may function like an induction machine when current from the ground-based source 114 is applied through a controller 120, to main stator windings 122 and/or to exciter stator windings 121 of the CFG 110. The controller 120 may limit inrush current. An exciter controller 124 may be placed in an inoperative state when the CFG 110 is performing as an induction motor. Alternatively the exciter controller 124 may be used to apply alternating current to the exciter stator windings 121 such that the CFG 110 may operate at a higher speed.

Figure 3:
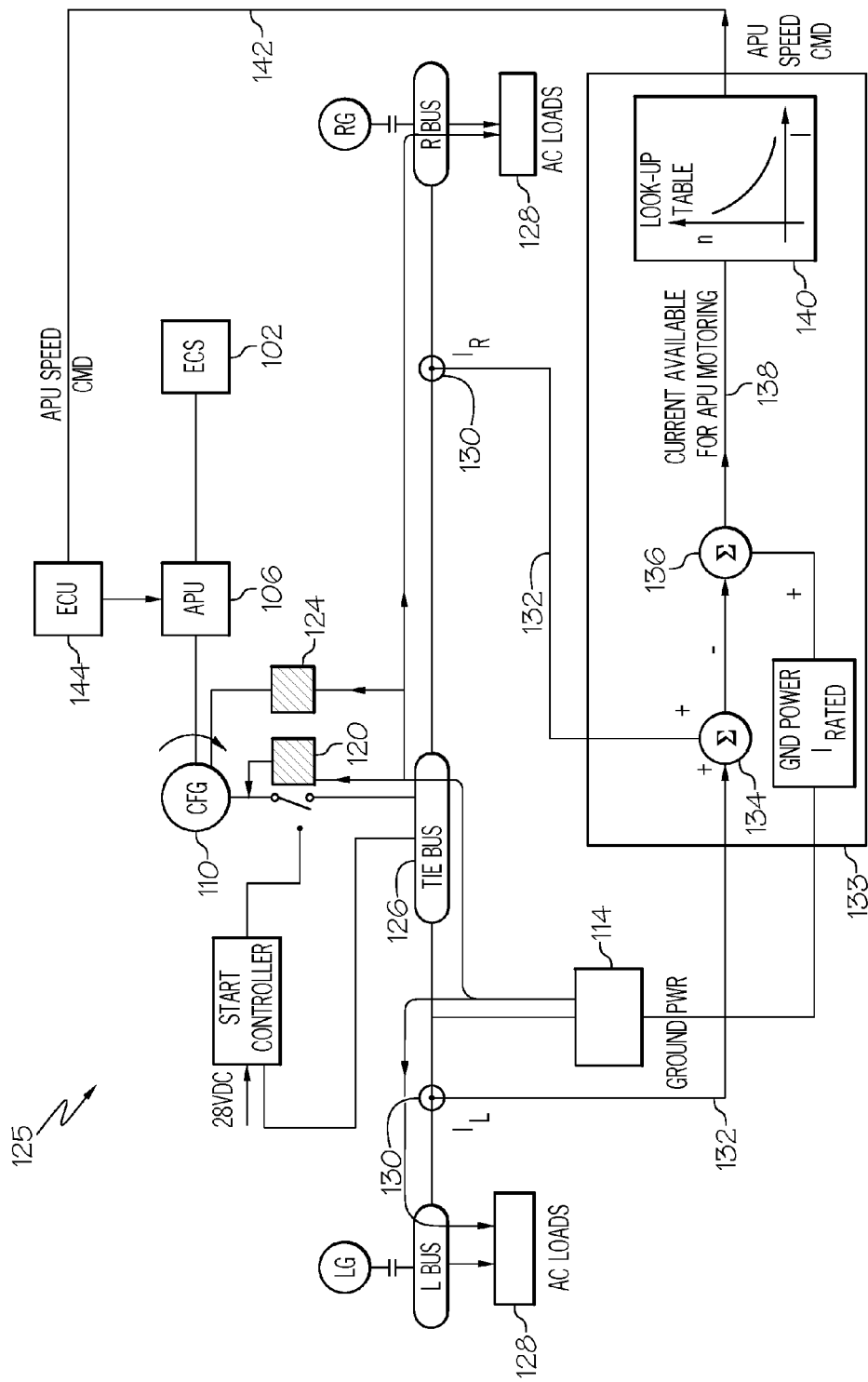
FIG. 3 is detailed block diagram of the system of FIG. 1 in accordance with an exemplary embodiment of the invention.

Referring now to FIG. 3, a schematic diagram illustrates a control system 125 for supplementing turbine shaft power of the APU 106 with power from the ground-based source 114. A typical ECS operating on a moderately hot day may require input of about 200 kW to about 250 kW of power. A typical ground-based power source may be capable of delivering only about 50 kW to about 100 kW of power. It may be seen that in order to effectively utilize the power from the ground-based source 114 for driving the ECS 102, there may be a need to utilize the ground-based power as a supplementary source of power to be added to the APU 106. With introduction of such supplementary power, fuel consumption by the APU 106 may be reduced.

Within the system 125, ground power may flow, along electrical power pathways 126, to AC loads 128 of the aircraft and to the CFG 110. Current sensors 130 may provide signals 132 to a turbine-speed controller 133. The turbine-speed controller 133 may include a first summer 134, a second summer 136, and a non-volatile memory 140. The signals 132 may be provided to the first summer 136 and may be indicative of current consumed by the AC loads 128. A second summer 136 may subtract an additive output of the first summer 132 from a value of current available from the ground-based source 114. An output signal 138 of the second summer may be indicative of an amount of current available from the ground-based source 114 for purposes of motoring assist of the APU 106. The signal 138 may be provided to the non-volatile memory 140. In an exemplary embodiment, the non-volatile memory 140 may be a look-up table 140. The look-up table 140 may incorporate a relationship between the signal 138 and an operating speed of the APU 106 sufficient to drive the ECS 102 when the APU 106 is being motoring assisted by the CFG 110. More particularly the operating speed of the APU 106 may be established on the basis that the CFG 110 is motoring responsively to the current indicated in the signal 138. An output of the turbine-speed controller 133 may comprise an APU speed command 142.

The APU speed command 142 may be provided to an engine control unit (ECU) 144 of the APU 106 so that the input/output shaft 112 of the APU 106 and the CFG 110 may both operate at a speed consistent with the speed command 142. The APU 106 speed may be controlled to ensure that the motoring torque produced by the CFG 110 is consistent with the current available from the ground-based source 114. Alternatively the CFG controller 124 may supply an alternating current to the CFG 110 exciter windings such that the CFG 110 produces a motoring torque consistent with the current available from the ground-based source 114 for the particular APU 106 speed.

Figure 4:
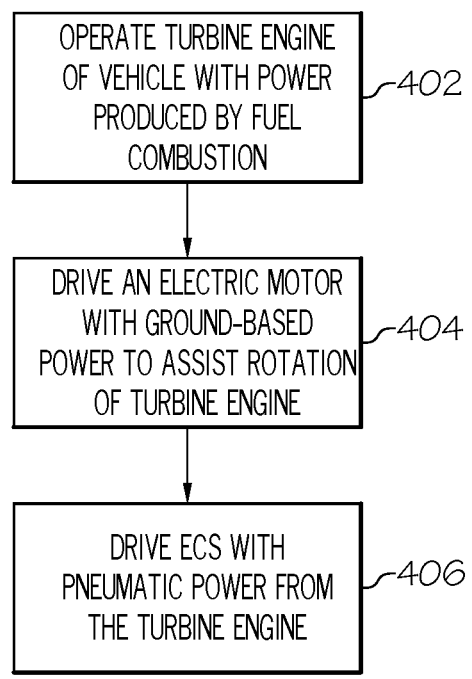
FIG. 4 is a flow chart of a method for utilizing ground-based electrical power to provide pneumatic power to an ECS of a vehicle in accordance with an exemplary embodiment of the invention.

Referring now to FIG. 4, a flow chart illustrates a method for utilizing ground-based electrical power to provide pneumatic power to an ECS of a vehicle while the vehicle is parked. In a step 402, a turbine engine of the vehicle may be operated with power produced by fuel combustion (e.g. the APU 106 may be operated). In a step 404, an electric machine may be driven with electrical power from a ground-based source (e.g., The CFG 110 may be operated as an induction machine so that the CFG 110 provides a motoring assist to the APU 106. Power to drive the CFG 110 may be provided by the ground-based power source 114.). In a step 406, the ECS may be driven with pneumatic power from the turbine engine (e.g., the ECS 102 may be driven with bleed air from the APU 106).

It may be noted that the apparatus described above may be installed or retrofitted on a vehicle such as a typical aircraft without incurring significant cost or weight penalties. A typical aircraft may be equipped with a preexisting CFG employed as a starter-generator. The present invention may provide a control system and a method for expanding a role of the pre-existing CFG to effectively use ground-based power to deliver motoring assist to a turbine engine as the turbine engine pneumatically drives an ECS of the aircraft. The control system 125 does not rely on multiple power semiconductors for its functionality. Consequently the control system 125 may be constructed as a relatively light weight and low cost system.

It should be understood, of course, that the foregoing relates to exemplary embodiments of the invention and that modifications may be made without departing from the spirit and scope of the invention as set forth in the following claims.

We claim:

1. A system for driving an environmental control system (ECS) of a vehicle with a ground-based electrical power source, the system comprising:
   a turbine engine on board the vehicle and coupled to the ECS to pneumatically drive the ECS;
   an electric machine on board the vehicle and mechanically coupled to the turbine engine to drive the turbine engine while the turbine engine drives the ECS; and
   a turbine speed controller in current sensor signal communication with the ground-based electrical power source and electrical power loads of the vehicle;
   wherein the turbine speed controller includes:
      a first summer is configured to receive a signal indicative of current consumed by the electrical power loads;
      a second summer configured to subtract an additive output value of the first summer from a value of current available from the ground-based electrical power source and, from the foregoing subtraction, generate an output signal, wherein the additive output value is indicative of current consumed by the electrical power loads; and
      a look-up table configured to receive the output signal and correlate the output signal to an operating speed of the turbine engine sufficient to drive the ECS when the turbine engine is being motoring assisted by the electric machine.

2. The system of claim 1 wherein the turbine engine is an auxiliary power unit (APU) of an aircraft.

3. The system of claim 1 wherein the electric machine is a starter-generator.

4. The system of claim 3 wherein main rotor windings of the starter-generator are connected directly to exciter rotor windings of the starter-generator.

5. A method for driving an environmental control system (ECS) of a vehicle with a ground-based electrical power source, comprising the steps of:
   operating a turbine engine of the vehicle with power produced by fuel combustion;
   driving an electric machine, coupled to the turbine engine, with ground-based electrical power to assist rotation of the turbine engine;
   driving the ECS with pneumatic power from the turbine engine;
   controlling an operating speed of the turbine engine via a turbine speed controller in current sensor signal communication with the ground-based electrical power source and electrical power loads of the vehicle;
   wherein the turbine speed controller includes:
      a first summer is configured to receive a signal indicative of current consumed by the electrical power loads;
      a second summer configured to subtract an additive output value of the first summer from a value of current available from the ground-based electrical power source and, from the foregoing subtraction generate an output signal, wherein the additive value is indicative of current consumed by the electrical power loads; and
      a look-up table configured to receive the output signal and correlate the output signal to an operating speed of the turbine engine sufficient to drive the ECS when the turbine engine is being motoring assisted by the electric machine.

6. The method of claim 5:
   wherein the electric machine is a starter-generator of the turbine engine; and
   wherein the starter-generator is operated as an induction machine.

7. The method of claim 5:
   wherein the electric machine is a starter-generator of the turbine engine;
   wherein the turbine engine is operable at a determined speed; and
   wherein the starter-generator produces motoring torque at the determined speed of the turbine engine.

* * * * *